United States Patent Office 3,071,385
Patented Jan. 1, 1963

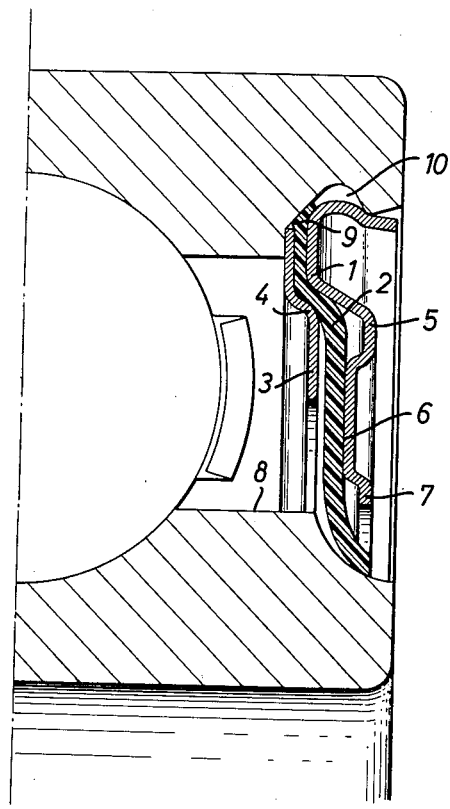

3,071,385
ANTI-FRICTION BEARING SEALS
Helmut Greiner, Schweinfurt, Germany, assignor to Kugelfischer Georg Schafer & Co., Schweinfurt, Germany
Filed Feb. 29, 1960, Ser. No. 11,762
Claims priority, application Germany Mar. 2, 1959
2 Claims. (Cl. 277—94)

At an earlier time, applicant has already suggested an anti-friction bearing seal comprising an elastic disc, preferably of rubber, and a sheet-metal ring vulcanized in position in the said elastic disc, the said seal having a bead-like enlargement which is snapped into position in an annular groove provided in one of the races of an anti-friction bearing, and also having a lip which sealingly engages a tapered or concave annular surface provided on the other race of the bearing, this known anti-friction bearing seal being characterized in that the said bead-like enlargement is adapted to be held in position by a suitably shaped turned recess in the respective bearing race, the said recess engaging the said enlargement in an axial direction. This arrangement provides the advantage that radial forces applied to the outer diameter of the seal can no longer cause the seal to bulge outwardly, so that the sealing lip or edge can no longer be lifted away from the inner race of the bearing, the result being that a satisfactory sealing action is obtained. Furthermore, the spring characteristic is no longer subject to the influence of radial forces, and a softer spring action is obtained.

The present invention now provides for a further improvement in the anti-friction bearing seal just described. The invention consists in an anti-friction bearing seal comprising an inner ring of metal and an elastic annular disc which latter carries a sealing bead sealingly engaging an annular groove formed in one of the races of the anti-friction bearing, and which latter carries a lip which sealingly engages a tapered or concave annular surface of the other race of the anti-friction bearing, the sealing rim or bead of the elastic disc being held against displacement in an axial direction. According to the invention, this anti-friction bearing seal is characterized by the fact that the elastic annular disc is clamped between the said inner metallic ring and another externally disposed metallic ring, and that the said sealing bead is formed by the outer portion of the elastic annular disc being squeezed out from between the two metallic rings. According to another feature of the invention, the said elastic annular disc is of uniform thickness prior to being fitted in position in the bearing. The elastic annular disc is preferably made of neoprene. In a particular advantageous embodiment of the invention, part of the inner metallic ring is offset outwardly and extends radially inwardly, terminating approximately at the pitch circle of the bearing on which the rolling members are located. According to still another feature of the invention, the outer metallic ring also has a portion thereof offset outwardly, the offset being greater than that of the offset portion of the inner metallic ring, and having a surface serving as an abutment for the elastic annular disc.

There have already been known anti-friction bearing seals comprising an elastic annular disc and a metallic ring. However, these known types of seals must be manufactured to close tolerances, and the elastic annular disc is not reliably held in position in the annular groove of the said one race of the bearing. The disc is easily pulled out and it does not form a sealing bead as is provided by the invention for the purpose of improving the sealing effect. For these reasons there have also been suggested bearing seals made in three pieces and comprising an externally disposed hood-like metallic member extending over the elastic member and the inner metallic member of the seal. However, such seals are expensive to manufacture and still suffer from the drawback that the elastic member of the seal is incapable of forming a sealing bead engaging one of the bearing races. Since, in these known seals, the inner metallic member has no axially offset portion, there results another drawback in that little space only is available in the interior of the bearing. Furthermore, seals have been suggested in which the various parts are connected together by a process of vulcanization, this method, however, resulting in a considerable increase in the cost of such seals.

The present invention eliminated all of the aforeindicated drawbacks. The component parts of the seal of the invention need not be connected by vulcanization, it being even undesirable to use a vulcanizing process. The elastic annular disc cannot work out of the annular groove of the said one race of the anti-friction bearing, because it forms a sealing bead located beyond the external peripheries of the two metallic rings. The said sealing bead provides an enlarged surface of contact between the elastic disc and the annular groove in the bearing race and thus improves the sealing action. Moreover, the seal according to the invention need not be manufactured to such close tolerances as have to be maintained in the case of conventional seals. Since the elastic annular disc is clamped in position between two metallic rings, the inner metallic ring tends to increase the area of contact between the elastic annular disc and the recess provided in the respective bearing race. Thus, the inner metallic ring simultaneously prevents the elastic annular disc from being cut off or displaced during assembly and, due to the provision of an externally offset portion, serves to hold part of the elastic annular disc in an offset position so as to increase the space available for the rolling bodies of the bearing.

Other objects and features of the invention will become apparent as the description proceeds, especially when taken in conjunction with the accompanying drawing illustrating a preferred embodiment of the invention in a fragmentary radial section.

As shown in the drawing, there is clamped in position between an outer metallic ring 1 and an inner metallic ring 3 an elastic annular disc 2 which is of uniform thickness before being assembled in the position shown. The said elastic annular disc is preferably made of neoprene but may, of course, be made of any other similar suitable material. The volume occupied by the material of the elastic annular disc is selected in such a manner that the outer portion of the disc is squeezed out between the two metallic rings so that it forms a sealing bead 9 when the outer metallic ring 1 is forced into an annular groove 10 of one of the races of the anti-friction bearing, the parts of the seal thus being compressed and the elastic annular disc being squeezed outwardly in the manner described. The annular groove 10 will hold the seal against axial displacement, because a peripheral portion of the outer metallic ring 1 is bent inwardly so as to engage one edge of the annular groove 10. While the outer metallic ring 1 holds the seal against axial displacement in relation to the outer race of the anti-friction bearing, it also protects the outer face of the elastic annular disc 2. The inner metallic ring 3 supports the elastic annular disc 2 from the inside.

As shown at 4 in the drawing, the inner metallic ring 3 is partially offset in an outward direction, the offset portion extending radially inwardly towards the axis of the bearing and terminating approximately at the pitch circle of the rolling bodies of the bearing. This configuration of the inner metallic ring 3 tends to increase the space within the bearing which is available for the accommodation of the rolling bodies. As shown at 5, the outer metallic ring 1 is partially offset outwardly to a greater extent than is the case with the inner metallic ring 3; the outer metallic ring 1 comprises an annular supporting surface 6 for the elastic annular disc 2 and another outwardly offset portion 7 which, in contrast to the offset portion of the inner metallic ring 3, extends radially inwardly into the immediate vicinity of the outer diameter 8 of the inner race of the anti-friction bearing.

What is claimed is:

1. An anti-friction bearing seal between the races of an anti-friction bearing comprising an annular groove defined by the outer race and comprising a positively sloped inner linear groove portion communicating with a negatively sloped curved outer groove portion spaced from the outer edge of said race, an inner and an outer metallic ring disposed between the races, an elastic annular disc having a lip and clamped between said rings, an outwardly curved portion formed at the end of said outer ring proximate said outer race and having a segment resiliently bearing against the outer edge of said annular groove and a segment cooperating with the outer base of said inner ring member to compress the edge portion of said elastic disc to form a reduced thickness neck and an enlarged bead sealingly pressed against the linear portion of said annular groove, and the other of said races having a concave-like annular taper on which said lip is held against axial displacement.

2. A seal according to claim 1, which is characterized in that part of said inner metallic ring is offset outwardly and extends radially inwardly towards the axis of the bearing, terminating approximately at the pitch circle of the bearing.

References Cited in the file of this patent

UNITED STATES PATENTS

| | | |
|---|---|---|
| 2,639,954 | Potter | May 26, 1953 |
| 2,712,460 | Saywell | July 5, 1955 |
| 2,728,616 | Potter | Dec. 27, 1955 |
| 2,766,082 | Ritchey | Oct. 9, 1956 |

FOREIGN PATENTS

| | | |
|---|---|---|
| 508,640 | Great Britain | July 4, 1939 |
| 622,418 | Great Britain | May 2, 1949 |
| 706,876 | Great Britain | Apr. 7, 1954 |
| 147,456 | Sweden | Oct. 26, 1954 |